(No Model.)
A. D. VAN BIBBER.
CHURN DASHER.
No. 413,583. Patented Oct. 22, 1889.
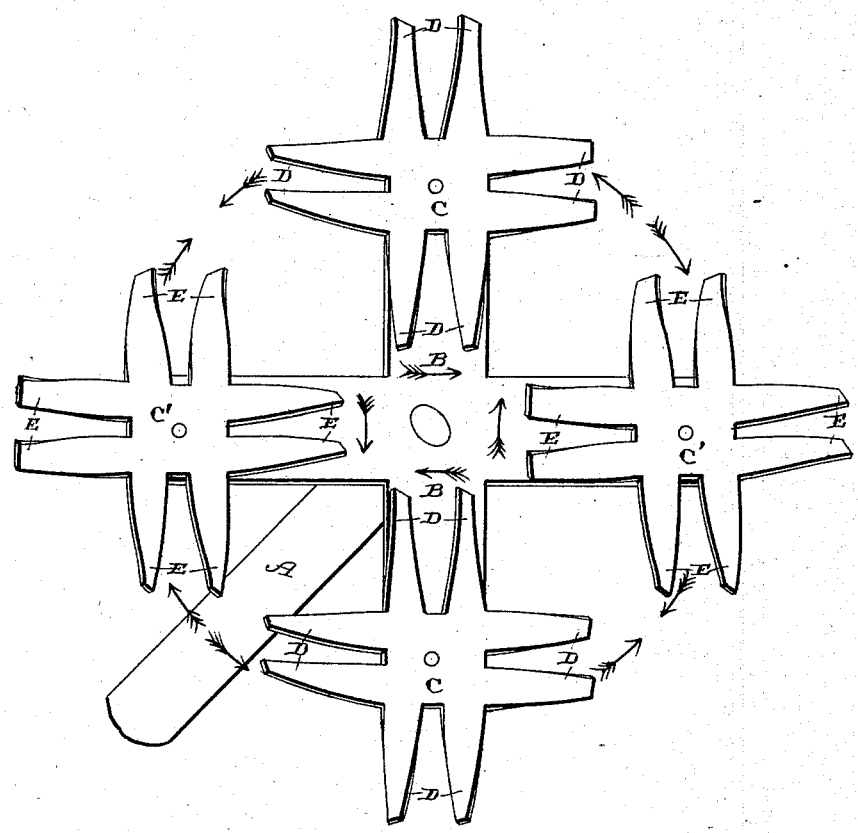
Witnesses:
E. P. Ellis,
J. M. Nesbit.
Inventor:
Andrew D. Van Bibber
per
J. A. Lehmann,
Atty.

UNITED STATES PATENT OFFICE.

ANDREW DONLEY VAN BIBBER, OF ZELA, WEST VIRGINIA.

CHURN-DASHER.

SPECIFICATION forming part of Letters Patent No. 413,583, dated October 22, 1889.

Application filed May 13, 1889. Serial No. 310,552. (No model.)

*To all whom it may concern:*

Be it known that I, ANDREW DONLEY VAN BIBBER, of Zela, in the county of Nicholas and State of West Virginia, have invented certain new and useful Improvements in Churn-Dashers; and I do hereby declare the following to be a full, clear, and exact description of the invention, such as will enable others skilled in the art to which it pertains to make and use it, reference being had to the accompanying drawing, which forms part of this specification.

My invention relates to an improvement in churn-dashers; and the object of my invention is to place a number of wheels upon the same plane in a dasher and to have the wheels revolve in different directions as the dasher is reciprocated, so as to thoroughly break up the butter-globules.

The accompanying drawing represents a perspective of a dasher which embodies my invention.

A represents the dasher-rod, and B the cross-head secured thereto. This cross-head is provided with four arms, and upon these arms are journaled the propeller-wheels C C'. The two wheels C are made to revolve in one direction by having their blades D twisted or inclined, as shown, while the wheels C' are made to revolve in the opposite direction by having their blades E bent or twisted so as to incline in the reverse direction from the blades D. This cross-head and the propeller-wheels may be made of galvanized metal or any other suitable material which will answer for the purpose. As the dasher is raised and lowered through the cream the propeller-wheels are caused to revolve rapidly first in one direction and then in the other, thereby causing conflicting currents in the cream, so as to break the butter-globules, and thus liberate the butter.

The propeller-wheels C C' are composed of four parallel pairs of wings, as shown, which construction causes a more violent and sudden collision of the opposing currents than mere radial wings would produce, as they take a much firmer hold upon the cream.

I am aware that one propeller-wheel has been placed above the other in a straight line, and this I disclaim. My wheels are placed upon the same plane, and two are caused to revolve in one direction and two in the other, so as to cause a greater amount of agitation in the cream as the dasher is operated. The wheels being placed upon the same plane, they take in a much larger surface of the cream, and hence every part of it is kept in violent motion from the top to the bottom, thus causing the butter to be liberated very rapidly.

I am also aware that the arms have been provided with apertures near their ends, and therein placed small propeller-wheels. This construction is very ineffective, as only that portion of the cream that passes through the small apertures is acted upon by the auxiliary wheels. My invention differs from this in having the propeller-wheels placed upon the outer face of the arms of the dasher, and cover practically the whole of the interior of the churn. As will be seen, they are pivoted at the outer ends of the arms, and have their wings projecting outward and revolving near the inner face of the churn, whereby the cream is prevented from adhering to the sides of the churn, as it otherwise would do. As shown by arrows, the propellers revolve in opposite directions, and, being on the outer side of the arms and projecting near each other, two currents whirling in opposite directions are produced and forced violently together on one side of the wheels and violently separated on the opposite side, and four opposing currents at the center, as shown by arrows, thereby producing a most effective breaking up of the globules and a complete separation. Thus it will be seen that in this construction the propellers form the dasher proper, while the arm (commonly called the "dasher") is merely a supporting and operating arm.

Having thus described my invention, I claim—

In a reciprocating dasher, the combination, with the operating-rod provided with four radial arms, of four propeller-wheels provided with twisted blades journaled thereon at their outer ends, the blades of each pair inclined in opposite directions and extending outward near to the periphery of its adjacent propeller and approximately to the junction of the arms, whereby the said wheels are revolved in opposite directions and cause opposing currents at their inner and outer peripheries, substantially as shown and described.

In testimony whereof I affix my signature in presence of two witnesses.

ANDREW DONLEY VAN BIBBER.

Witnesses:
JNO. H. H. DUFFY,
HOWARD TEMPLETON.